United States Patent Office 3,516,878
Patented June 23, 1970

3,516,878
ULTRA-HIGH-STRENGTH PRESSURE VESSEL
Donald J. Sandstrom and Delman A. Law, Los Alamos, N. Mex., assignors to the United States of America as represented by the United States Atomic Energy Commission
No Drawing. Filed Jan. 13, 1967, Ser. No. 609,718
Int. Cl. B01j 3/00; C21d 9/00
U.S. Cl. 148—142                                                  5 Claims

ABSTRACT OF THE DISCLOSURE

A prestressed lamellar pressure vessel wherein the prestressing is accomplished by placing a semiaustenitic precipitation hardenable stainless steel sphere within a martensitic stainless steel sphere (to close tolerances) and heat treating.

---

The invention described herein was made in the course of, or under, a contract with the U.S. Atomic Energy Commission.

This invention relates to a pressure vessel and more particularly to methods and means for stressing lamellar pressure vessels.

High-strength pressure vessels are becoming increasingly important, particularly for high-pressure gas containment. It is known that lamellar pressure vessels are more effective than single wall vessels in that a smaller thickness is required to contain equal pressures. It is beneficial to prestress the components so as, assuming a two-layer vessel, to engender compressive forces in the inner layer and tensile forces in the exterior layer.

The present invention provides a very simple method of accomplishing this prestressing. In the invention a semiaustenitic precipitation hardenable stainless steel layer is placed within a martensitic stainless steel layer and heat treated. Under the proper conditions the semiaustenitic layer can be made to transform into martensite with an accompanying large increase in volume. If the two layers are in close proximity, the transformation causes tensile forces in the outer layer and compressive forces in the inner layer, thereby resulting in a very high-strength pressure vessel.

It is accordingly the object of the present invention to construct a prestressed lamellar pressure vessel by very simple means.

In practicing the invention a semiaustenitic precipitation hardenable material is annealed at, e.g., 1950° F. for 1½ hours, so that the maximum amount of carbon is in solution, thereby preventing transformation of the austenite to martensite when cooled to room temperature. The austenitic material is then machined at room temperature. An outer layer of martensitic material is then placed over the austenitic layer utilizing fairly close tolerances (on the order of about 1 mil). The assembly is then welded, heliarc welding being suitable for small thickness vessels and electron beam welding being more suitable for thicker vessels. The assembly is then heated to about 1750° F. for 1½ hours as a trigger annealing treatment. This treatment causes carbon to be precipitated from the austenite matrix in the form of carbides. This precipitation in effect lowers the gross carbon content of the semiaustenitic matrix and in turn raises the temperature at which martensite transformation in the semiaustenitic stainless steel will occur upon subsequent cooling. This does not affect the fit of the assembly since at about 1300° F. the martensitic material transforms to austenitic material.

An analysis of materials referred to in this application may be found in the Battelle Memorial Institute Defense Metals Center Report DMIC–III, entitled "The Physical Metallurgy of Precipitation Hardenable Stainless Steels," dated Apr. 20, 1959.

When cooling the martensitic stainless steel, transformation to martensite begins at about 200° F., and the semiaustenitic stainless steel begins transformation to martensite at 60° F. and continues transforming until about −100° F. The quenching from 1750° F. to −100° F. should be accomplished as quickly as possible and, in a specific embodiment, this time was on the order of about one hour. This temperature is held for about 8 hours to ensure complete transformation. At this point, owing to the volume changes accompanying transformation of austenitic material to martensite, a prestressed assembly is obtained wherein the inner layer is in compression and the outer layer in tension. In order to further strengthen the material, a precipitation hardening treatment is then conducted. For example, the assembly is heated to 950° F. and aged 2 hours, cooled to 900° F. and aged 3 hours, and then cooled to 850° F. and aged 3 hours. Precipitation hardening could also be accomplished by heating to 1050° F. for about 2 hours.

The manner in which the improvement provided by this invention can be incorporated into a pressure vessel is demonstrated by the following example.

Two hemispheres (of about 2.8-in. inner diameter) of 17–7 PH stainless steel (one of which having a duct to accommodate a tube) are welded by electron beam welding. The wall thickness of the 17–7 PH stainless steel is 0.2 in. This assembly is then heated to 1950° F. for about 1½ hours. After returning to room temperature, two hemispheres (one of which having a duct to accommodate the tube) of 17–4 PH stainless steel are welded around the assembly. The 17–4 PH stainless steel hemispheres are of 0.2-in. wall thickness and electron beam welding is again used. A tolerance is left between the semiaustenitic precipitation hardenable 17–7 PH stainless steel and the martensitic 17–4 PH stainless steel of about 1 mil. The entire assembly is then heated to 1750° F. for about 1½ hours and thereafter quickly quenched (in the space of about 1 hour) to −100° F. This temperature is maintained for 8 hours. The vessel is then subjected to aging. In this specific example the assembly is heated to 950° F. for 2 hours, cooled to 900° F. and aged 3 hours and then cooled to 850° F. and aged 3 hours. An assembly made according to this procedure was pressure tested and withstood 55,000 p.s.i. which was the limit of the testing equipment. It is calculated that this pressure vessel can take up to about 90,000 p.s.i. before failure.

What is claimed is:

1. A method for prestressing lamellar vessels which comprises forming the vessel by placing a layer of a semiaustenitic precipitation hardenable stainless steel within and in close proximity to a martensitic stainless steel layer, heat treating to about 1750° F. and then rapidly quenching to −100° F. whereby the semiaustenitic stainless steel layer becomes compressed and the martensitic stainless steel layer is in tension.

2. A method as in claim 1 wherein the semiaustenitic precipitation hardenable material is first heated to an annealing temperature at which the maximum carbon is in solution and then cooled to about 68° F. for machining and joining.

3. A method as in claim 2 wherein the semiaustenitic precipitation hardenable steel is 17–7 PH stainless steel and the martensitic steel is 17–4 PH stainless steel.

4. A method as in claim 3 wherein the assembly is held at about −100° F. for 8 hours and then precipitation hardened.

5. A method as in claim 1 for prestressing a pressure vessel wherein the vessel consists of two hemispheres of semiaustenitic stainless steel welded together to form a sphere and two hemispheres of martensitic stainless steel welded together around the semiaustenitic stainless steel sphere.

References Cited

UNITED STATES PATENTS

| | | | |
|---|---|---|---|
| 2,428,518 | 10/1947 | Everett | 148—34 X |
| 3,231,338 | 1/1966 | Andrus | 23—290 |
| 3,268,103 | 8/1966 | Nelson | 23—290 X |

OSCAR R. VERTIZ, Primary Examiner

G. O. PETERS, Assistant Examiner

U.S. Cl. X.R.

23—289; 148—34, 39